United States Patent
Suenaga

(10) Patent No.: US 10,891,918 B2
(45) Date of Patent: Jan. 12, 2021

(54) ELECTRONIC APPARATUS HAVING FUNCTION TO REDUCE LUMINOUS INTENSITY OF DISPLAY AND DETECT INTENSITY OF AMBIENT LIGHT IN STATE IN WHICH LUMINOUS INTENSITY OF DISPLAY IS REDUCED, AND LIGHT INTENSITY DETECTION METHOD AND STORAGE MEDIUM STORING LIGHT INTENSITY DETECTION PROGRAM HAVING SAME

(71) Applicant: CASIO COMPUTER CO., LTD., Tokyo (JP)

(72) Inventor: Takashi Suenaga, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/290,384

(22) Filed: Mar. 1, 2019

(65) Prior Publication Data
US 2019/0304399 A1 Oct. 3, 2019

(30) Foreign Application Priority Data
Mar. 29, 2018 (JP) .................. 2018-064733

(51) Int. Cl.
  *G09G 5/10* (2006.01)
  *G09G 3/3208* (2016.01)
  *G04G 9/00* (2006.01)
  *G04G 21/02* (2010.01)
  *G09G 3/36* (2006.01)

(52) U.S. Cl.
  CPC ............. *G09G 5/10* (2013.01); *G04G 9/0017* (2013.01); *G04G 21/02* (2013.01); *G09G 3/3208* (2013.01); *G09G 3/36* (2013.01); *G09G 2300/023* (2013.01); *G09G 2320/0626* (2013.01); *G09G 2354/00* (2013.01); *G09G 2360/144* (2013.01)

(58) Field of Classification Search
  CPC .......... G09G 3/36; G09G 3/30; G09G 3/3208; G09G 2360/144; G09G 2320/0626; G09G 2300/023; G09G 2354/00; G06F 3/1423; G04G 9/0017; G04G 21/02; G04G 21/08
  See application file for complete search history.

(56) References Cited

U.S. PATENT DOCUMENTS 9,001,023 B2 4/2015 Mashiba et al.
2007/0132749 A1 6/2007 Peng et al.
(Continued)

FOREIGN PATENT DOCUMENTS

JP 2007164160 A 6/2007
JP 2013092642 A 5/2013

*Primary Examiner* — Ryan A Lubit
(74) *Attorney, Agent, or Firm* — Holtz, Holtz & Volek PC

(57) ABSTRACT

An electronic apparatus includes: a display; a light sensor located on an opposite side of a display surface of the display, and detects intensity of ambient light; and a control unit, in a first state in which luminous intensity of the display is not less than a first threshold, in the case where the intensity of ambient light detected by the light sensor is less than predetermined intensity of light, outputs, to the display, a signal to reduce the luminous intensity of the display to a second state that is not more than a second threshold that is less than the first threshold, and in the second state, outputs a signal to detect the intensity of ambient light to the light sensor.

11 Claims, 7 Drawing Sheets

(56) References Cited

U.S. PATENT DOCUMENTS

| | | | |
|---|---|---|---|
| 2007/0229452 A1* | 10/2007 | Sano | G01J 1/4204 345/102 |
| 2012/0169236 A1* | 7/2012 | Kim | G06F 1/1684 315/127 |
| 2013/0201223 A1* | 8/2013 | Li | G09G 3/3225 345/690 |
| 2014/0022223 A1* | 1/2014 | Jung | G09G 5/10 345/207 |
| 2014/0055326 A1* | 2/2014 | Lai | G09G 3/3233 345/77 |
| 2014/0132158 A1* | 5/2014 | Land | G09G 3/20 315/152 |
| 2018/0204540 A1* | 7/2018 | Lin | G06F 1/3265 |

* cited by examiner

ELECTRONIC APPARATUS HAVING FUNCTION TO REDUCE LUMINOUS INTENSITY OF DISPLAY AND DETECT INTENSITY OF AMBIENT LIGHT IN STATE IN WHICH LUMINOUS INTENSITY OF DISPLAY IS REDUCED, AND LIGHT INTENSITY DETECTION METHOD AND STORAGE MEDIUM STORING LIGHT INTENSITY DETECTION PROGRAM HAVING SAME

CROSS-REFERENCE TO RELATED APPLICATIONS

This application is based upon and claims the benefit of priority of Japanese Patent Application No. 2018-064733 filed on Mar. 29, 2018, the entire disclosure of which is incorporated herein by reference in its entirety.

BACKGROUND OF THE INVENTION

1. Field of the Invention

The technical field relates to an electronic apparatus, a light intensity detection method, and a storage medium storing a light intensity detection program.

2. Description of the Related Art

The following technique is known as disclosed in, for example, U.S. Patent Application Publication No. 2014/0132158: A light sensor is located on the opposite side of an organic light emitting diode (OLED) as a display, and the intensity of light is adjusted depending on the detection value of external light detected by the light sensor.

With the conventional technique described in the foregoing patent document, however, as the luminous intensity (e.g. luminance) of the display increases relatively and the intensity of external light decreases relatively, the contribution of light from the display to the detection value of the light sensor increases, and the reliability of the control performed depending on the intensity of external light decreases.

SUMMARY OF THE INVENTION

An embodiment relates to an electronic apparatus, a light intensity detection method, and a storage medium storing a light intensity detection program.

To solve the stated problem, an embodiment is an electronic apparatus including: a display; a light sensor located on an opposite side of a display surface of the display, and detects intensity of ambient light; and a control unit, in a first state in which luminous intensity of the display is not less than a first threshold, in the case where intensity of ambient light detected by the light sensor is less than predetermined intensity of light, outputs, to the display, a signal to reduce the luminous intensity of the display to a second state that is not more than a second threshold that is less than the first threshold, and in the second state, outputs a signal to detect the intensity of ambient light to the light sensor.

DETAILED DESCRIPTION OF THE INVENTION

Each embodiment is described in detail below with reference to drawings.

Figure 1:
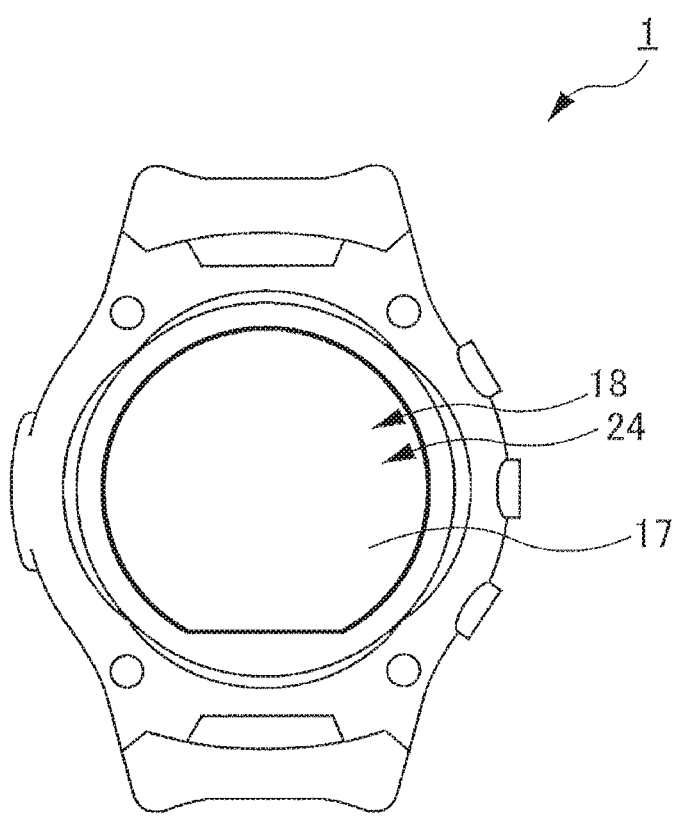
FIG. 1 is a schematic diagram illustrating an electronic apparatus according to an embodiment.

FIG. 1 is a schematic diagram illustrating an electronic apparatus 1 according to an embodiment of the present invention. As illustrated in FIG. 1, the electronic apparatus 1 according to this embodiment is configured as a wristwatch-type apparatus (e.g. a smartwatch).

The electronic apparatus 1 includes a first display 18 and a second display 24 (described later). The second display 24 is placed on the first display 18.

Further, a touch panel 17 (described later) is placed on the second display 24.

Thus, in the electronic apparatus 1, the display of the second display 24 can be superimposed on the display of the first display 18, and touch operation can be performed in a display area.

Figure 2:
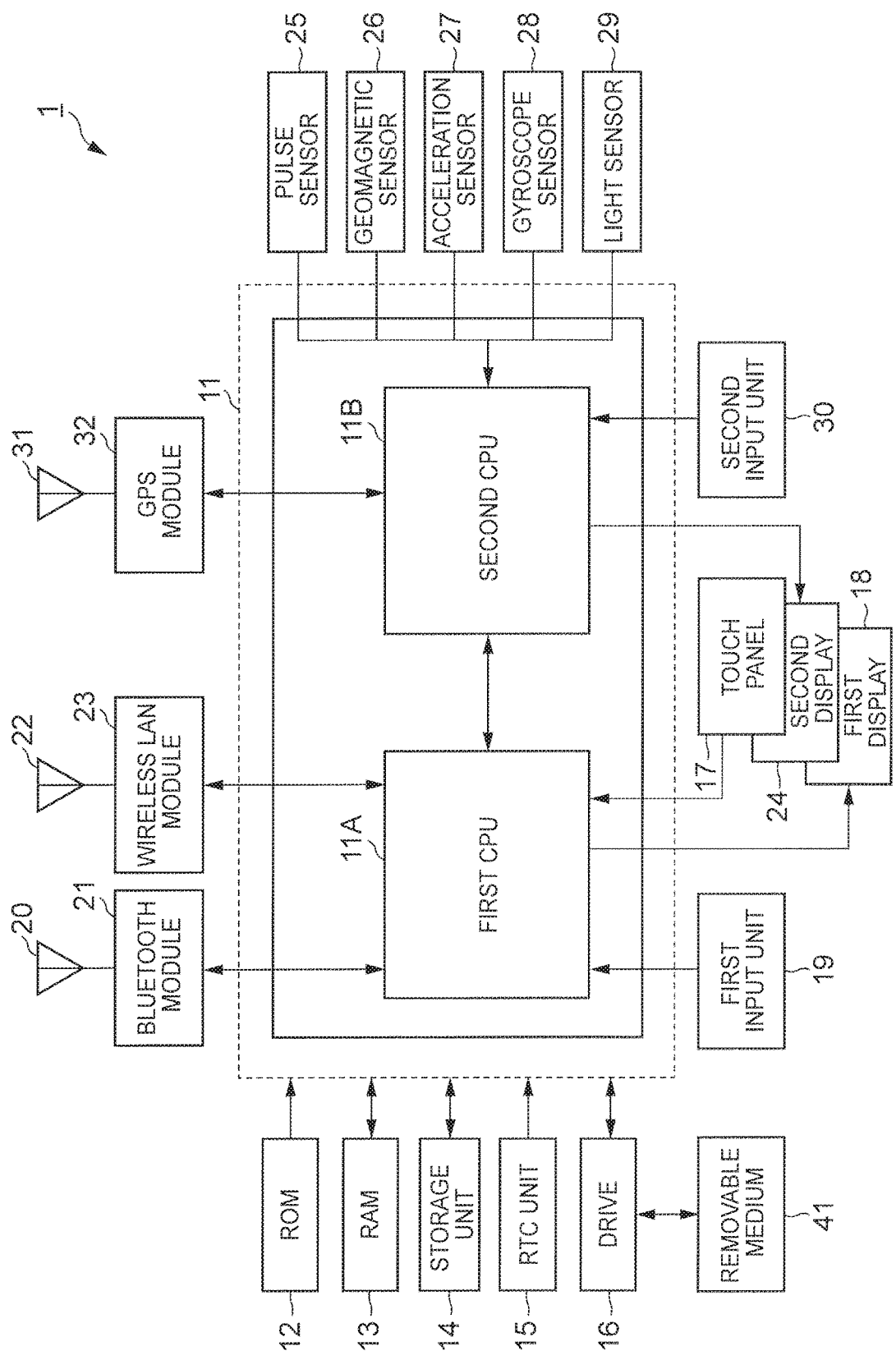
FIG. 2 is a block diagram illustrating the hardware structure of the electronic apparatus.

FIG. 2 is a block diagram illustrating the hardware structure of the electronic apparatus 1. As illustrated in FIG. 2, the electronic apparatus 1 includes a central processing unit (CPU) 11, a read only memory (ROM) 12, a random access memory (RAM) 13, a storage unit 14, a real time clock (RTC) unit 15, a drive 16, a touch panel 17, a first display 18, a first input unit 19, a Bluetooth® antenna 20, a Bluetooth module 21, a wireless local area network (LAN) antenna 22, a wireless LAN module 23, a second display 24, a pulse sensor 25, a geomagnetic sensor 26, an acceleration sensor 27, a gyroscope sensor 28, a light sensor 29, a second input unit 30, a global positioning system (GPS) antenna 31, and a GPS module 32.

The CPU 11 includes a first CPU 11A and a second CPU 11B. The first CPU 11A performs arithmetic processing and executes the process of an operating system (OS), to control the functions of the electronic apparatus 1.

In this embodiment, the first CPU 11A causes the first display 18 to display e-mail, a message about weather information, and the like received via the Bluetooth module 21 or the wireless LAN module 23, and receives operation input via the touch panel 17.

The first CPU 11A also recognizes voice input via the first input unit 19, and performs other processes of implemented functions.

In this embodiment, the first CPU 11A also acquires a time signal from the RTC unit 15 at predetermined timing.

The second CPU 11B executes the process of a specific program, to cause the second display 24 to perform display, acquires the detection result of each sensor, and performs other processes of implemented functions.

In this embodiment, the second CPU 11B calculates time and causes the second display 24 to display time, day of week, date, etc., based on the time signal received from the first CPU 11A.

The process (such as time calculation) of the specific program executed by the second CPU 11B is simpler operation than the process of the OS executed by the first CPU 11A. Thus, the processing load is low, and the process can be performed with low power.

Therefore, the hardware specifications required for the second CPU 11B are lower than those required for the first CPU 11A.

The ROM 12 stores various programs executed by the first CPU 11A and the second CPU 11B and default data. The first CPU 11A and the second CPU 11B can read data from the ROM 12.

For example, the ROM 12 stores the program of the OS executed by the first CPU 11A and programs executed under control of the OS, or the specific program (built-in program for achieving the wristwatch function in this embodiment) executed by the second CPU 11B.

The RAM 13 provides a working memory space to the first CPU 11A and the second CPU 11B, and stores working temporary data.

The first CPU 11A and the second CPU 11B can read data from and write data to the RAM 13.

For example, the RAM 13 provides a system area and a work area when the first CPU 11A executes the OS, and provides a storage area when the second CPU 11B executes the specific program.

The storage unit 14 is a non-volatile memory that can be read and written. For example, the storage unit 14 is a flash memory or an electrically erasable and programmable read only memory (EEPROM).

The first CPU 11A and the second CPU 11B can read data from and write data to the storage unit 14.

The storage unit 14 stores data generated by, for example, the functions of the electronic apparatus 1.

The drive 16 can have mounted thereon a removable medium 41 such as a magnetic disk, an optical disc, a magneto-optical disc, or a semiconductor memory.

The removable medium 41 stores data detected by each sensor and the like.

The touch panel 17 is provided on a display screen of the second display 24, and is, for example, a capacitive or resistive touch panel.

The touch panel 17 detects the position and details of touch operation by the user on the operation surface, generates a signal corresponding to the operation, and outputs the signal to the first CPU 11A as an input signal.

The first display 18 includes an organic EL display (OLED), and displays information on its display screen according to control of the first CPU 11A.

The first input unit 19 includes a microphone for converting voice into an electric signal, and outputs a signal indicating voice input (e.g. a voice command for operation) to the first CPU 11A.

The Bluetooth antenna 20 is an antenna for transmitting and receiving an electromagnetic wave based on Bluetooth, and includes for example, a monopole antenna.

The Bluetooth antenna 20 transmits an electric signal for wireless communication received from the Bluetooth module 21 as an electromagnetic wave, and converts a received electromagnetic wave into an electric signal and outputs the electric signal to the Bluetooth module 21.

The Bluetooth module 21 transmits a signal to another apparatus via the Bluetooth antenna 20, according to an instruction of the first CPU 11A.

The Bluetooth module 21 also receives a signal transmitted from another apparatus, and outputs information indicated by the received signal to the first CPU 11A.

The wireless LAN antenna 22 is an antenna capable of receiving a radio wave of a frequency corresponding to wireless communication used by the wireless LAN module 23, and includes, for example, a loop antenna or a rod antenna.

The wireless LAN antenna 22 transmits an electric signal for wireless communication received from the wireless LAN module 23 as an electromagnetic wave, and converts a received electromagnetic wave into an electric signal and outputs the electric signal to the wireless LAN module 23.

The wireless LAN module 23 transmits a signal to another apparatus via the wireless LAN antenna 22, according to an instruction of the first CPU 11A.

The wireless LAN module 23 also receives a signal transmitted from another apparatus, and outputs information indicated by the received signal to the first CPU 11A.

The second display 24 includes a polymer network (PN) liquid crystal display capable of partly or wholly transmitting light, and displays (e.g. segment display) information on the display screen according to control of the second CPU 11B.

In this embodiment, the PN liquid crystal display in the second display 24 is, for example, placed on the display screen of the organic EL display of the first display 18 described above.

In the PN liquid crystal display, a part to which a potential is not applied has liquid crystal molecules arranged randomly, and reflects light. Thus, the display by the PN liquid crystal display is performed in the part to which a potential is not applied.

A part to which a potential is applied has liquid crystal molecules vertically aligned with respect to the display screen, and accordingly can transmit light. In detail, the part to which a potential is applied can transmit light from the organic EL display, so that the display by the organic EL display can be viewed through the PN liquid crystal display. Hence, in the display area of the electronic apparatus 1, the display by the second display 24 can be superimposed on the display by the first display 18.

The pulse sensor 25 is installed on the opposite side (the side facing the user's wrist) of the electronic apparatus 1, and detects the pulse of the user wearing the electronic apparatus 1.

The geomagnetic sensor 26 detects geomagnetic direction, and outputs information indicating the detected geomagnetic direction to the second CPU 11B.

The acceleration sensor 27 detects acceleration in three-axis direction in the electronic apparatus 1, and outputs information indicating the detected acceleration to the second CPU 11B.

The gyroscope sensor 28 detects angular velocity in three-axis direction in the electronic apparatus 1, and outputs information indicating the detected angular velocity to the second CPU 11B.

The light sensor 29 is installed in a predetermined part of the opposite side of the first display 18. The light sensor 29 detects brightness (intensity of light) in the display area of the electronic apparatus 1, and outputs information indicating the detected brightness to the second CPU 11B.

Figure 3A:
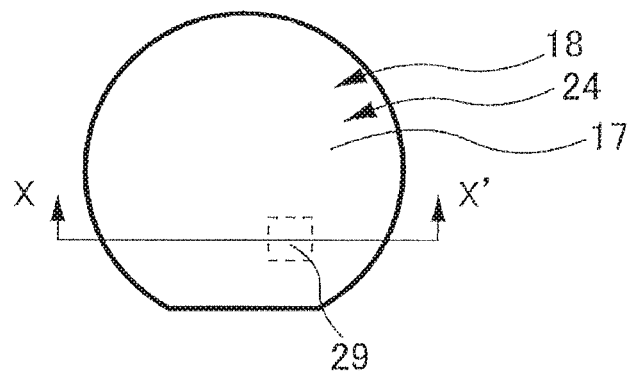
FIG. 3A is a schematic diagram illustrating the installation form of a light sensor in a display area of the electronic apparatus.
Figure 3B:
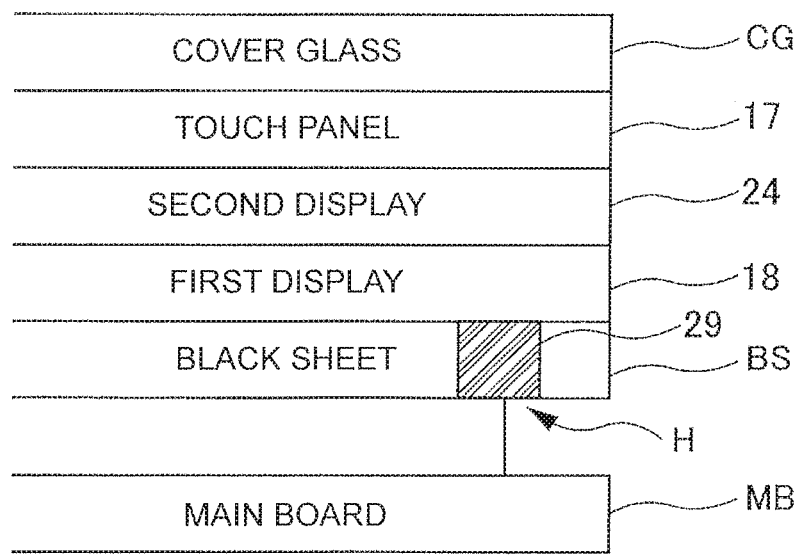
FIG. 3B is a schematic diagram illustrating an X-X' section in FIG. 3A.

FIG. 3A is a schematic diagram illustrating the installation form of the light sensor 29 in the display area of the electronic apparatus 1. FIG. 3B is a schematic diagram illustrating an X-X' section in FIG. 3A.

As illustrated in FIG. 3A, the light sensor 29 is installed in a predetermined part (the lower right center position designated by dashed lines in FIG. 3B) in the display area of the first display 18 and the second display 24.

As illustrated in FIG. 3B, the display area of the electronic apparatus 1 has a section structure in which a cover glass CG, the touch panel 17, the second display 24, the first display 18, a black sheet BS, and a main board MB are stacked in this order from the front side.

The black sheet BS is a member for adjusting coloring in the case where light is transmitted through the second display 24 and the first display 18 for visual recognition. In this embodiment, black is visually recognized.

A through hole H is formed in part of the black sheet BS. The light sensor 29 is installed in the through hole H.

Light enters the light sensor 29 from the front side in the display area of the electronic apparatus 1. The light sensor 29 detects, for example, that the electronic apparatus 1 is placed under bright external light and the intensity of ambient light of the display area is high.

However, since light from the first display 18 enters the light sensor 29, the detection value of the light sensor 29 is influenced by the light from the first display 18.

Referring back to FIG. 2, the second input unit 30 includes various buttons, and inputs various information according to instruction operation by the user.

The GPS antenna 31 receives a radio wave transmitted from a GPS satellite, converts it into an electric signal, and outputs the converted electric signal (hereafter referred to as "GPS signal") to the GPS module 32.

The GPS module 32 detects the position (latitude, longitude, altitude) of the electronic apparatus 1 and the current time indicated by GPS, based on a GPS signal received from the GPS antenna 31.

The GPS module 32 outputs information indicating the detected position and current time to the second CPU 11B.

Figure 4:
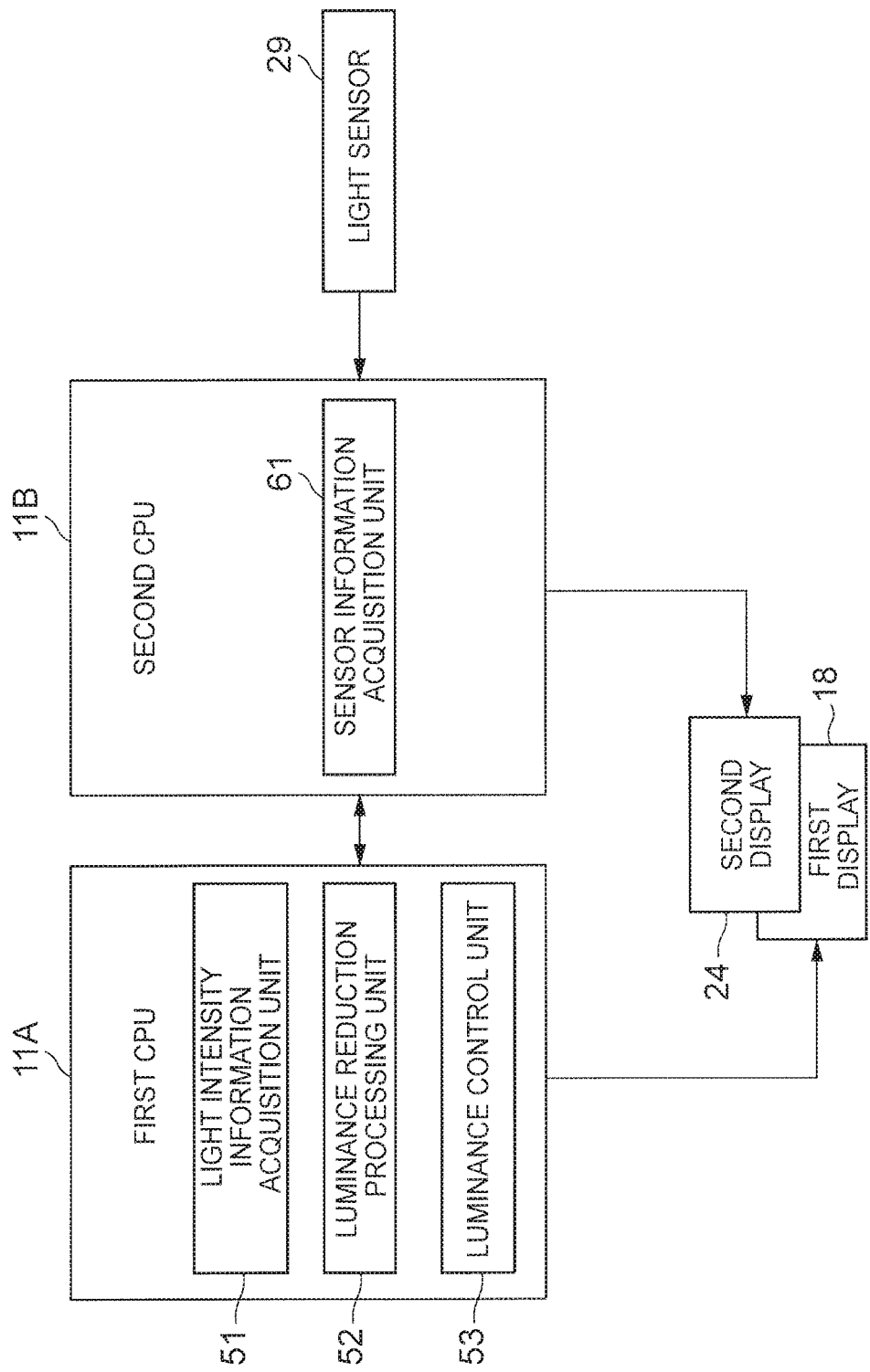
FIG. 4 is a block diagram illustrating a structure for executing a luminance control process in the electronic apparatus.

FIG. 4 is a block diagram illustrating a structure for executing a luminance control process in the structure of the electronic apparatus 1 in FIG. 2.

The luminance control process is a process of controlling the luminance intensity of the display screen of the first display 18 depending on the brightness (intensity of light) of external light.

In the case of executing the luminance control process, n light intensity information acquisition unit 51, a luminance reduction processing unit 52 (an example of the control unit), and a luminance control unit 53 (an example of the adjustment unit) function in the first CPU 11A and a sensor information acquisition unit 61 functions in the second CPU 11B, as illustrated in FIG. 4.

The light intensity information acquisition unit 51 acquires intensity of ambient light detected by the sensor information acquisition unit 61 in the second CPU 11B.

In the case where the intensity of ambient light detected by the sensor information acquisition unit 61 in a first state in which the luminance of the first display 18 is not less than a first threshold is less than predetermined intensity of light, the luminance reduction processing unit 52 performs a luminance reduction process of reducing the luminance of the first display 18 to not more than a second threshold that is less than the first threshold. Hereafter, the state in which the luminance of the first display 18 has been reduced to not more than the second threshold as a result of the luminance reduction process is also referred to as "second state".

When the first display 18 is in the second state, the contribution of light from the first display 18 to the detection value of the light sensor 29 decreases.

Hence, the detection value of the light sensor 29 in the second state has higher reliability than the detection value of the light sensor 29 in the first state.

It is assumed here that the reliability of the detection value of the light sensor 29 is higher when the degree to which the detection value represents solely the intensity of external light is higher.

The luminance reduction processing unit 52 performs the luminance reduction process in this way. The reliability of the detection value of the light sensor 29 increases as a result of the luminance reduction process.

The reliability of the luminance control process is improved as the reliability of the detection value of the light sensor 29 increases.

The first threshold is a value greater than 0, and may be a fixed value or a variable value.

Since the first threshold is a value greater than 0, the first state is a state in which the first display 18 emits light.

The second threshold is a value less than the first threshold, and may be, for example, 0. In the case where the second threshold is 0, the second state is a state in which the first display 18 does not emit light.

The predetermined intensity of light may be adapted so that a state in which the intensity of external light is relatively low can be detected.

The predetermined intensity of light may be a fixed value or a variable value.

In the case where the predetermined intensity of light is a variable value, the predetermined intensity of light changes depending on the luminance of the first display 18 in such a manner that the predetermined intensity of light is lower when the luminance of the first display 18 is higher (see FIG. 7 described later).

This is because the contribution of light from the first display 18 to the detection value of the light sensor 29 is higher when the luminance of the first display 18 is higher.

The luminance reduction processing unit 52 may reduce the luminance of the whole first display 18 to not more than the second threshold, as the luminance reduction process.

Alternatively, the luminance reduction processing unit 52 may reduce the luminance of part of the first display 18, e.g. the luminance of the part (hereafter referred to as "part directly above the light sensor 29") of the first display 18 overlapping the light sensor 29, to not more than the second threshold.

In this case, for example, an image signal of a predetermined pixel area in an image output to the first display 18 may be changed to represent "black".

The predetermined pixel area herein is the pixel area of the part directly above the light sensor 29 in the first display 18.

The luminance control unit 53 controls the luminance of the first display 18, based on the intensity of ambient light acquired by the light intensity information acquisition unit 51.

In detail, in the case where the electronic apparatus 1 is in a bright (high intensity of light) environment, the luminance control unit 53 controls the luminance of the first display 18 to be high luminance corresponding to the detected intensity of ambient light, in order to prevent the display screen from being relatively dark and less visible.

In the case where the electronic apparatus 1 is in a dark (low intensity of light) environment, the luminance control unit 53 controls the luminance of the first display 18 to be low luminance corresponding to the detected intensity of ambient light, in order to prevent the display screen from being excessively bright and less visible.

The value of luminance corresponding to the intensity of ambient light is held in the electronic apparatus 1 as, for example, data in table form or a predetermined function.

The luminance control unit 53 controls the luminance with reference to such data in table form or predetermined function.

The sensor information acquisition unit 61 acquires the detection value of each sensor such as the intensity of ambient light detected by the light sensor 29.

Figure 5:
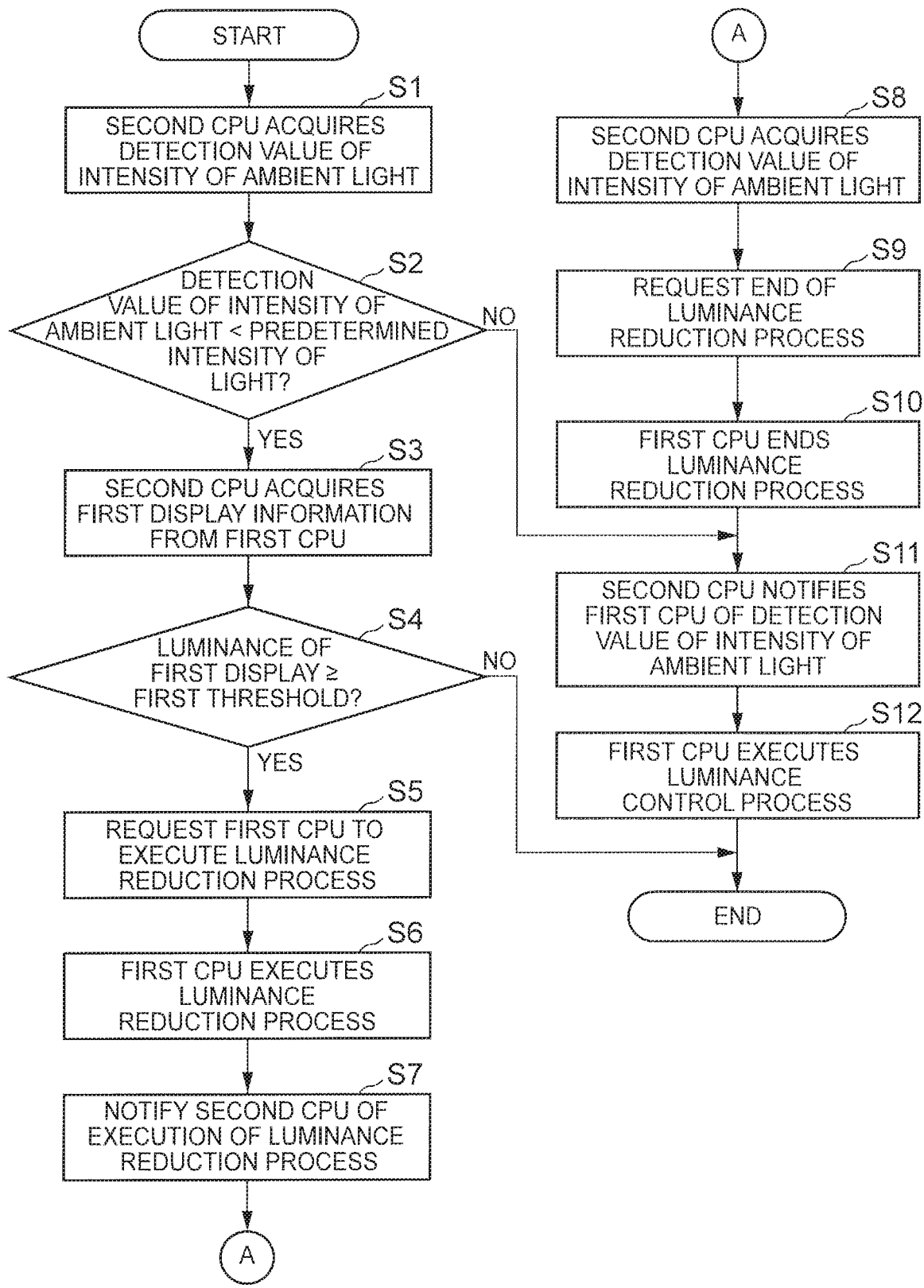
FIG. 5 is a flowchart illustrating a luminance reduction process and a luminance control process.

FIG. 5 is a flowchart illustrating the luminance reduction process and the luminance control process executed by the electronic apparatus 1 in FIG. 1 having the structure in FIG. 4.

The luminance control process starts when the electronic apparatus 1 is turned on, and ends when the electronic apparatus 1 is turned off.

In step S1, the sensor information acquisition unit 61 in the second CPU 11B acquires a detection value of intensity of ambient light from the light sensor 29.

In step S2, the sensor information acquisition unit 61 in the second CPU 11B determines whether or not the detection value of intensity of ambient light acquired in step S1 is less than the predetermined intensity of light.

In the case of determining that the detection value of intensity of ambient light is less than the predetermined intensity of light, the process advances to step S3.

In the case of determining that the detection value of intensity of ambient light is not less than the predetermined intensity of light, the process advances to step S11.

In step S3, the second CPU 11B acquires information (hereafter referred to as "first display information") indicating the current state of the first display 18, from the first CPU 11A.

The first display information may be information indicating whether or not the first display 18 is on, or information indicating the luminance when the first display 18 is on.

In step S4, the second CPU 11B determines whether or not the luminance of the first display 18 is not less than the first threshold, based on the first display information acquired in step S3.

In this case, the first threshold may correspond to the minimum luminance when the first display 18 is on.

In the case of determining that the first display 18 is on, the process advances to step S5. Otherwise, the process ends.

In step S5, the second CPU 11B requests the first CPU 11A to execute the luminance reduction process.

In step S6, the luminance reduction processing unit 52 in the first CPU 11A executes the luminance reduction process.

The luminance reduction process is as described above.

As a result of executing the luminance reduction process, the first display 18 changes to the second state as described above.

In step S7, the first CPU 11A notifies the second CPU 11B that the luminance reduction process has been executed.

In step S8, the sensor information acquisition unit 61 in the second CPU 11B acquires a detection value of intensity of ambient light from the light sensor 29.

This detection value of intensity of ambient light is a detection value acquired when the first display 18 is in the second state.

In step S9, the second CPU 11B requests the first CPU 11A to end the luminance reduction process.

In step S10, the first CPU 11A turns the first display 18 on (i.e. returns the first display 18 to the state before the luminance reduction process), in response to the request in step S9.

In step S11, the sensor information acquisition unit 61 in the second CPU 11B notifies the first CPU 11A of the detection value of intensity of ambient light acquired in step S1 or the detection value of intensity of ambient light acquired in step S8.

Specifically, in the case where the determination result in step S2 is "NO", the sensor information acquisition unit 61 notifies the first CPU 11A of the detection value of intensity of ambient light acquired in step S1.

In the case where the determination result in step S2 is "YES", the sensor information acquisition unit 61 notifies the first CPU 11A of the detection value of intensity of ambient light acquired in step S8.

In this case, the light intensity information acquisition unit 51 in the first CPU 11A acquires the detection value of intensity of ambient light acquired when the first display 18 is in the second state.

In step S12, the luminance control unit 53 in the first CPU 11A executes the luminance control process, based on the detection value of intensity of ambient light acquired in step S11 (the detection value acquired when the first display 18 is in the second state).

The luminance control process is as described above.

When the electronic apparatus 1 is turned off, the luminance control process ends. When the display is continued, the process returns to step S1 and is repeated.

With such a process, in the electronic apparatus 1, the luminance of the display screen of the first display 18 is adjusted depending on the intensity of ambient light detected by the light sensor 29.

In the case where the intensity of ambient light detected by the light sensor 29 is less than the predetermined intensity of light set beforehand, whether or not the luminance of the first display 18 is not less than the first threshold is determined.

In the case where the luminance of the first display 18 is not less than the first threshold, the contribution of light from the first display 18 to the detection value of the intensity of ambient light sensor 29 is estimated to be high. Accordingly, the luminance reduction process is performed to temporarily reduce the luminance of the first display 18.

This reduces the contribution of light from the first display 18 to the detection value of the light sensor 29. Hence, a highly reliable detection value of intensity of ambient light can be obtained.

Consequently, the luminance control process can be executed based on such a highly reliable detection value of intensity of ambient light, and the reliability of the control (luminance control process) performed depending on the intensity of external light can be enhanced.

Figure 6:
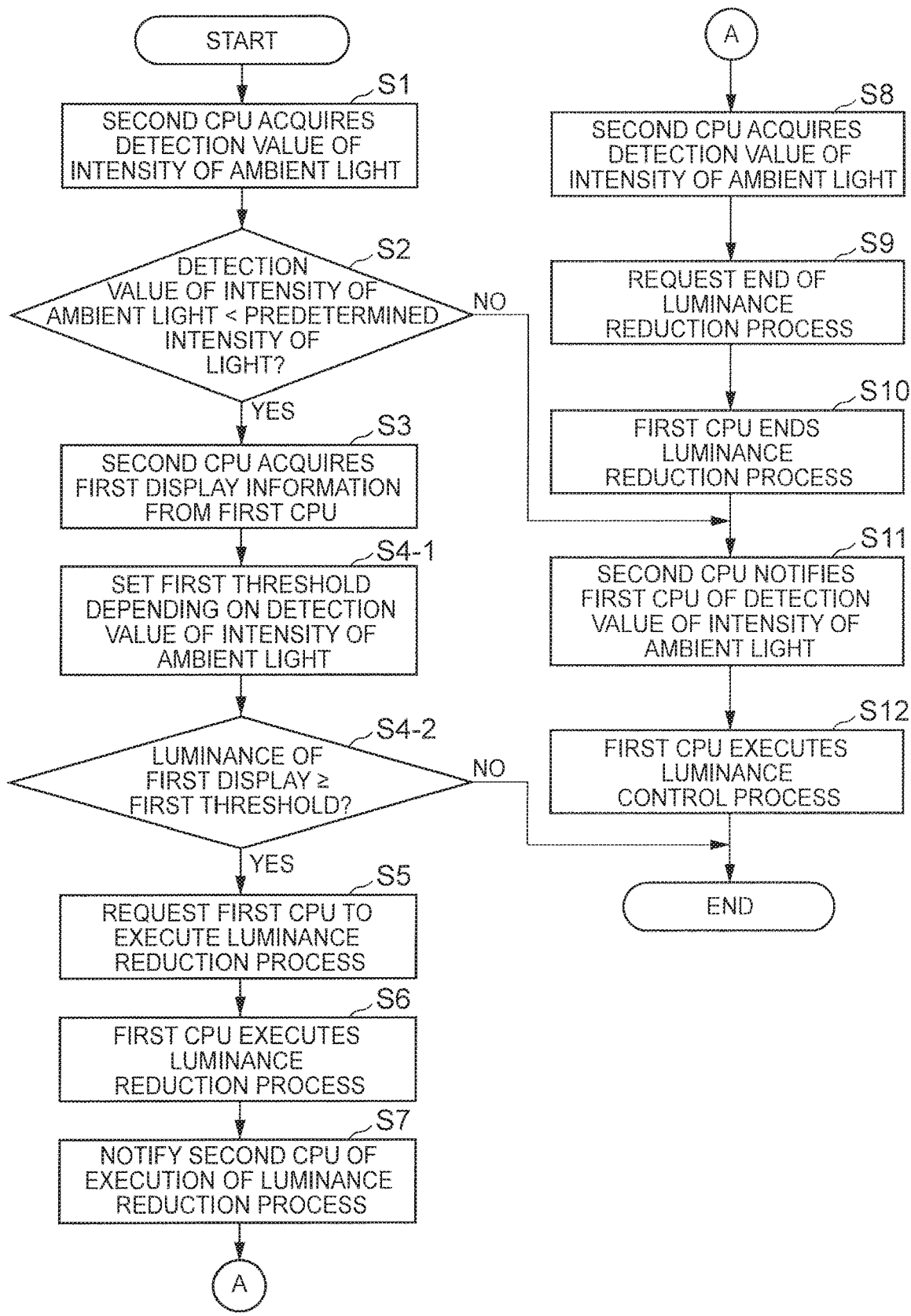
FIG. 6 is a flowchart illustrating a modification to the process in FIG. 5.

FIG. 6 is a flowchart illustrating a modification to the process in FIG. 5.

The process illustrated in FIG. 6 differs from the process illustrated in FIG. 5 in that step S4 is replaced with steps S4-1 and S4-2.

In step S4-1, the second CPU 11B sets the first threshold based on the detection value of intensity of ambient light acquired in step S1.

The first threshold may be set to a predetermined proportion (e.g. 90%) to the detection value of intensity of ambient light.

In step S4-2, the second CPU 11B determines whether or not the luminance of the first display 18 is not less than the first threshold set in step S4-1, based on the first display information acquired in step S3.

In the case where the luminance of the first display 18 is not less than the first threshold, the process advances to step S5. Otherwise, the process ends.

With such a process, in the electronic apparatus 1, the luminance of the display screen of the first display 18 is adjusted depending on the intensity of ambient light detected by the light sensor 29.

In the case where the intensity of ambient light detected by the light sensor 29 is less than the predetermined intensity of light set beforehand, whether or not the luminance of the first display 18 is not less than the first threshold corresponding to the detected intensity of ambient light is determined.

In the case where the luminance of the first display 18 is not less than the first threshold, the contribution of light from the first display 18 to the detection value of the light sensor 29 is estimated to be high.

Accordingly, the luminance reduction process is performed to temporarily reduce the luminance of the first display 18.

This reduces the contribution of light from the first display 18 to the detection value of the light sensor 29. Hence, a highly reliable detection value of intensity of ambient light can be obtained.

Consequently, the luminance control process can be executed based on such a highly reliable detection value of intensity of ambient light.

The reliability of the control (luminance control process) performed depending on the intensity of external light can thus be enhanced.

Figure 7:
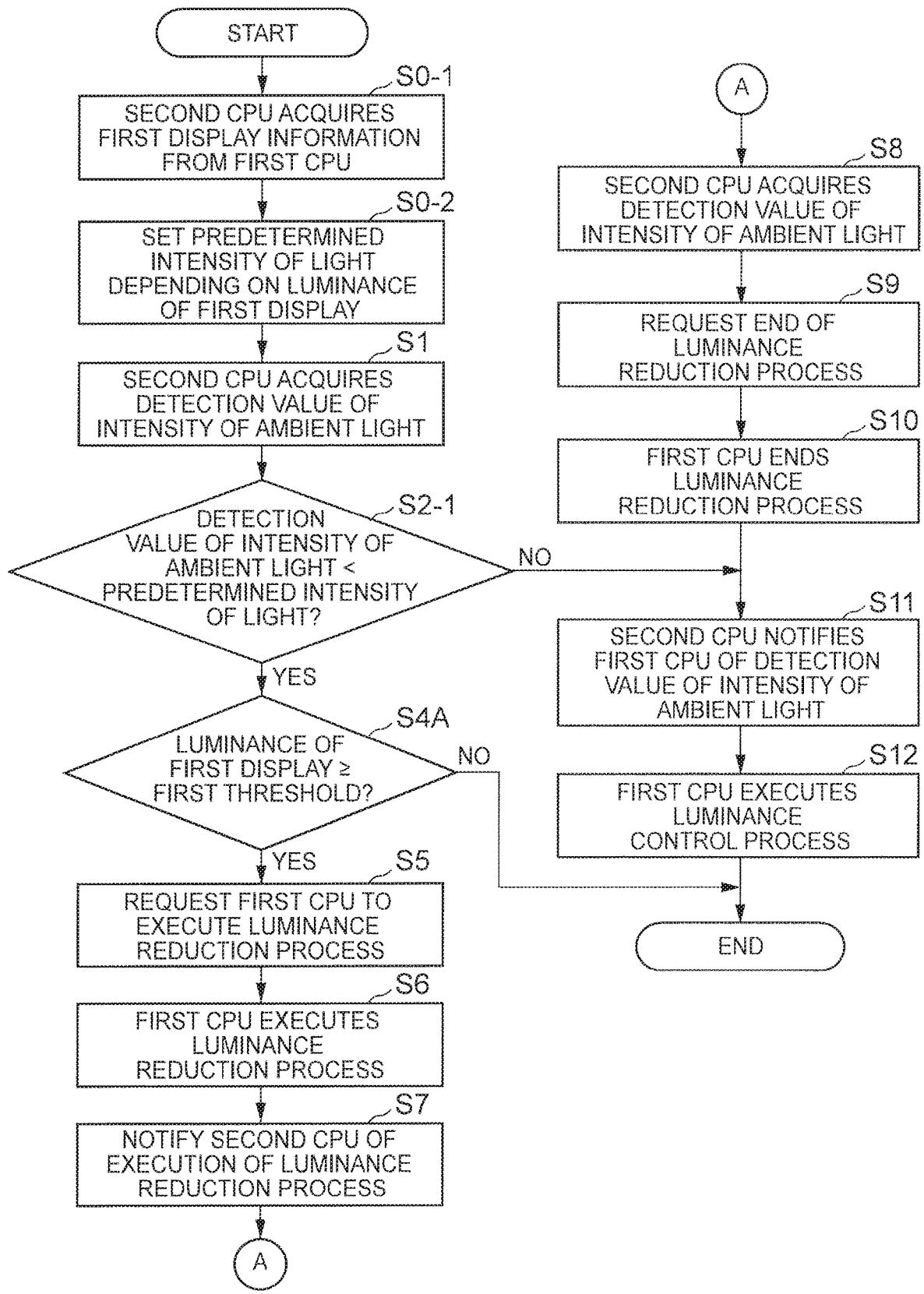
FIG. 7 is a flowchart illustrating another modification to the process in FIG. 5.

FIG. 7 is a flowchart illustrating another modification to the process in FIG. 5.

The process illustrated in FIG. 7 differs from the process illustrated in FIG. 5 in that step S3 is omitted. Moreover, steps S0-1 and S0-2 not included in the process illustrated in FIG. 5 are added.

Further, steps S2 and S4 in the process illustrated in FIG. 5 are replaced with steps S2-1 and S4A.

In step S0-1, the second CPU 11B acquires information (first display information) indicating the current state of the first display 18 from the first CPU 11A.

In FIG. 7, the first display information is information indicating the luminance when the first display 18 is on.

In step S0-2, the second CPU 11B sets the predetermined intensity of light corresponding to the luminance of the first display 18, based on the first display information acquired in step S0-1.

Here, the second CPU 11B sets the predetermined intensity of light so as to be lower when the luminance of the first display 18 is higher.

In detail, the second CPU 11B varies the predetermined intensity of light based on the luminance of the first display 18.

In step S2-1, the sensor information acquisition unit 61 in the second CPU 11B determines whether or not the detection value of intensity of ambient light acquired in step S1 is less than the predetermined intensity of light set in step S0-2.

In the case of determining that the detection value of intensity of ambient light is less than the predetermined intensity of light, the process advances to step S4A. Otherwise, the process advances to step S11.

In step S4A, the second CPU 11B determines whether or not the first display 18 is on, based on the first display information acquired in step S0-1.

In detail, the second CPU 11B determines whether or not the luminance of the first display 18 is not less than the first threshold, based on the first display information acquired in step S0-1.

In this case, the first threshold may correspond to the minimum luminance when the first display 18 is on.

In the case of determining that the first display 18 is on, the process advances to step S5. Otherwise, the process ends.

In FIG. 7, in step S11, the sensor information acquisition unit 61 in the second CPU 11B notifies the first CPU 11A of the detection value of intensity of ambient light acquired in step S1 or the detection value of intensity of ambient light acquired in step S8.

Specifically, in the case where the determination result in step S2-1 is "NO", the sensor information acquisition unit 61 notifies the first CPU 11A of the detection value of intensity of ambient light acquired in step S1.

In the case where the determination result in step S2-1 is "YES", the sensor information acquisition unit 61 notifies the first CPU 11A of the detection value of intensity of ambient light acquired in step S8.

In this case, the light intensity information acquisition unit 51 in the first CPU 11A acquires the detection value of intensity of ambient light acquired when the first display 18 is in the second state.

With such a process, in the electronic apparatus 1, the luminance of the display screen of the first display 18 is adjusted depending on the intensity of ambient light detected by the light sensor 29.

In the case where the intensity of ambient light detected by the light sensor 29 is less than the predetermined intensity of light corresponding to the luminance of the first display 18, whether or not the luminance of the first display 18 is not less than the first threshold corresponding to the detected intensity of ambient light is determined.

In the case where the luminance of the first display 18 is not less than the first threshold, the contribution of light from the first display 18 to the detection value of the light sensor 29 is estimated to be high. Accordingly, the luminance reduction process is performed to temporarily reduce the luminance of the first display 18.

This reduces the contribution of light from the first display 18 to the detection value of the light sensor 29. Hence, a highly reliable detection value of intensity of ambient light can be obtained. Consequently, the luminance control process can be executed based on such a highly reliable detection value of intensity of ambient light, and the reliability of the control (luminance control process) performed depending on the intensity of external light can be enhanced.

The series of processes described above may be executed by hardware or by software.

In other words, the foregoing structure is merely illustrative, and does not particularly limit the present invention.

As long as the electronic apparatus 1 has functions for executing the series of processes as a whole, which functional blocks are used to realize such functions is not limited to the foregoing structure.

Furthermore, one functional block may be realized by hardware alone, by software alone, or by a combination of hardware and software.

The functional structure in this embodiment is realized by a processor performing arithmetic processing. Examples of processors that can be used in this embodiment include various types of processors used alone such as single-processor, multi-processor, and multi-core processor, and combinations of these various types of processors and processing circuits such as application specific integrated circuit (ASIC) and field-programmable gate array (FPGA).

In the case where the series of processes is executed by software, a program constituting the software is installed from a network or a recording medium into a computer or the like.

The computer may be a computer incorporated in dedicated hardware. The computer may be a computer capable of various functions when installed with various programs, such as a general-purpose personal computer.

A recording medium including such a program may be realized not only by the removable medium 41 in FIG. 2 which is distributed separately from the apparatus to provide the program to the user, but also by, for example, a recording medium provided to the user in the state of being incorporated in the apparatus beforehand.

The removable medium 41 is, for example, a magnetic disk (such as a floppy disk), an optical disc, or a magneto-optical disc. Examples of the optical disc include a compact disk read-only memory (CD-ROM), a digital versatile disk (DVD), and a Blu-ray® disc. Examples of the magneto-optical disc include a mini disk (MD).

The recording medium provided to the user in the state of being incorporated in the apparatus beforehand is, for example, the ROM 12 in FIG. 2 in which the program is stored and the semiconductor memory or the like included in the storage unit 14 in FIG. 2.

In this specification, the steps included in the program stored in the recording medium may or may not be executed in time series in the stated order.

The steps included in the program stored in the recording medium include processes executed in parallel or separately.

Although each embodiment has been described in detail above, the present invention is not limited to any specific embodiment, and various modifications and changes are possible within the scope of the claims.

All or more than one of the components in the foregoing embodiments may be combined.

For example, although the foregoing embodiments describe the case where the electronic apparatus 1 includes the first display 18 and the second display 24, the present invention is not limited to such, and the electronic apparatus 1 may include only the first display 18.

Although the foregoing embodiments describe the case where the first display 18 that displays the display contents is composed of an OLED, the first display 18 may be composed of any other display device such as a liquid crystal display.

Although the foregoing embodiments describe the case where the CPU 11 in the electronic apparatus 1 includes the first CPU 11A and the second CPU 11B, the present invention is not limited to such, and the CPU 11 may be a single CPU having both the functions of the first CPU 11A and the functions of the second CPU 11B.

Although the foregoing embodiments describe a digital camera wristwatch-type apparatus (e.g. smartwatch) as an example of the electronic apparatus 1 to which the present invention is applied, the present invention is not limited to such.

For example, the present invention is applicable to electronic apparatuses having luminance adjustment function in general.

In detail, the present invention is applicable to a notebook personal computer, a printer, a television receiver, a video camera, a portable navigation device, a mobile phone, a smartphone, a portable game machine, etc.

What is claimed is:

1. An electronic apparatus comprising:
a display;
a light sensor located on an opposite side of a display surface of the display, and detects intensity of ambient light; and
a control unit which is configured to acquire a detection result indicating the intensity of ambient light detected by the light sensor, and to perform a luminance control process of controlling a luminous intensity of the display based on the acquired detection result,
wherein, in a case in which the display is in a first state in which luminous intensity of the display is not less than a first threshold and the detection result acquired by the control unit indicates that the intensity of ambient light detected by the light sensor while the display is in the first state is less than a predetermined intensity of light, the control unit is configured to (i) perform a first luminance reduction process of controlling the display to reduce the luminous intensity of the display to a second state that is not more than a second threshold that is less than the first threshold, (ii) newly acquire a detection result from the light sensor indicating the intensity of ambient light detected by the light sensor while the display is in the second state, (iii) after newly acquiring the detection result, end the first luminance reduction process and control the display to return to the first state, irrespective of the intensity of ambient light indicated in the newly acquired detection result, and (iv) after having controlled the display to return to the first state, perform the luminance control process to control the luminous intensity of the display based on the newly acquired detection result.

2. The electronic apparatus according to claim 1, wherein in a case in which the display is in the first state and the detection result acquired by the control unit indicates that the intensity of ambient light detected by the light sensor while the display is in the first state is not less than the predetermined intensity of light, the control unit is configured to perform the luminance control process to control the luminous intensity of the display based on the acquired detection result, without performing the first luminance reduction process.

3. The electronic apparatus according to claim 2, wherein the control unit changes the predetermined intensity of light depending on the luminous intensity of the display, such that the predetermined intensity of light is lower when the luminous intensity of the display is higher.

4. The electronic apparatus according to claim 3, wherein the control unit is configured to acquire display information which is information indicating luminance of the display or information indicating whether or not the display is on, and the control unit is configured to determine whether or not the luminous intensity of the display is not less than the first threshold based on the acquired display information.

5. The electronic apparatus according to claim 2, wherein the control unit is configured to acquire display information which is information indicating luminance of the display or information indicating whether or not the display is on, and the control unit is configured to determine whether or not the luminous intensity of the display is not less than the first threshold based on the acquired display information.

6. The electronic apparatus according to claim 1, wherein the control unit changes the predetermined intensity of light depending on the luminous intensity of the display, such that the predetermined intensity of light is lower when the luminous intensity of the display is higher.

7. The electronic apparatus according to claim 6, wherein the control unit is configured to acquire display information which is information indicating luminance of the display or information indicating whether or not the display is on, and the control unit is configured to determine whether or not the luminous intensity of the display is not less than the first threshold based on the acquired display information.

8. The electronic apparatus according to claim 1, wherein the control unit is configured to acquire display information which is information indicating luminance of the display or information indicating whether or not the display is on, and the control unit is configured to determine whether or not the luminous intensity of the display is not less than the first threshold based on the acquired display information.

9. The electronic apparatus according to claim 1, wherein, in the first luminance reduction process, the control unit is configured to control the display to reduce the luminous intensity to the second state that is not more than the second threshold in only a part of the display that overlaps with the light sensor.

10. A light intensity detection method performed by an electronic apparatus including a display and a light sensor located on an opposite side of a display surface of the display and which detects intensity of ambient light, the light intensity detection method comprising:
  acquiring a detection result indicating an intensity of ambient light detected by the light sensor; and
  performing a luminance control process of controlling a luminous intensity of the display based on the acquired detection result;
  wherein the method further comprises, in a case in which the display is in a first state in which luminous intensity of the display is not less than a first threshold and the acquired detection result indicates that the intensity of ambient light detected by the light sensor while the display is in the first state is less than a predetermined intensity of light:
  (i) performing a first luminance reduction process of controlling the display to reduce the luminous intensity of the display to a second state that is not more than a second threshold that is less than the first threshold,
  (ii) newly acquiring a detection result from the light sensor indicating the intensity of ambient light detected by the light sensor while the display is in the second state,
  (iii) after newly acquiring the detection result, ending the first luminance reduction process and controlling the display to return to the first state, irrespective of the intensity of ambient light indicated in the newly acquired detection result, and
  (iv) after having controlled the display to return to the first state, performing the luminance control process to control the luminous intensity of the display based on the newly acquired detection result.

11. A non-transitory computer-readable storage medium having stored thereon a program that is executable by a computer of an electronic apparatus including a display and a light sensor located on an opposite side of a display surface of the display and which detects intensity of ambient light, the program being executable by the computer to cause the computer to perform functions comprising:
  acquiring a detection result indicating an intensity of ambient light detected by the light sensor; and
  performing a luminance control process of controlling a luminous intensity of the display based on the acquired detection result;
  wherein, in a case in which the display is in a first state in which luminous intensity of the display is not less than a first threshold and the acquired detection result indicates that the intensity of ambient light detected by the light sensor while the display is in the first state is less than a predetermined intensity of light, the program causes the computer to perform further functions comprising:
  (i) performing a first luminance reduction process of controlling the display to reduce the luminous intensity of the display to a second state that is not more than a second threshold that is less than the first threshold,
  (ii) newly acquiring a detection result from the light sensor indicating the intensity of ambient light detected by the light sensor while the display is in the second state,
  (iii) after newly acquiring the detection result, ending the first luminance reduction process and controlling the display to return to the first state, irrespective of the intensity of ambient light indicated in the newly acquired detection result, and
  (iv) after having controlled the display to return to the first state, performing the luminance control process to control the luminous intensity of the display based on the newly acquired detection result.

* * * * *